(12) United States Patent
Barnes et al.

(10) Patent No.: US 9,742,654 B1
(45) Date of Patent: Aug. 22, 2017

(54) COMMUNICATION INTERFACE TESTING

(71) Applicant: Western Digital Technologies, Inc., Irvine, CA (US)

(72) Inventors: Edwin D. Barnes, Lake Forest, CA (US); Zhenhua Mai, Guangdon Province (CN); Michael F. Klett, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 425 days.

(21) Appl. No.: 14/582,545

(22) Filed: Dec. 24, 2014

(51) Int. Cl.
*G06F 13/00* (2006.01)
*H04L 12/26* (2006.01)

(52) U.S. Cl.
CPC .................................. *H04L 43/50* (2013.01)

(58) Field of Classification Search
None
See application file for complete search history.

(56) References Cited

U.S. PATENT DOCUMENTS

| | | |
|---|---|---|
| 6,343,260 B1 | 1/2002 | Chew |
| 7,392,147 B2 | 6/2008 | Lo et al. |
| 7,701,705 B1 | 4/2010 | Szeremeta |
| 7,979,759 B2 * | 7/2011 | Carnevale ................ G11C 5/04 365/201 |
| 8,064,194 B2 | 11/2011 | Szeremeta |
| 8,113,873 B1 | 2/2012 | Sarraf |
| 8,133,426 B1 | 3/2012 | Yurchenco et al. |
| 8,358,395 B1 | 1/2013 | Szeremeta |
| 8,417,979 B2 | 4/2013 | Maroney |
| 8,462,460 B1 | 6/2013 | Szeremeta et al. |
| 8,498,088 B1 | 7/2013 | Klein |
| 8,547,658 B1 | 10/2013 | Szeremeta |
| 2007/0136025 A1 | 6/2007 | Lo et al. |
| 2009/0307384 A1 | 12/2009 | Liu |
| 2013/0151898 A1 | 6/2013 | Hou |

* cited by examiner

*Primary Examiner* — Cheng-Yuan Tseng
(74) *Attorney, Agent, or Firm* — Chang & Hale LLP

(57) ABSTRACT

Systems and methods are disclosed for testing performance of communications interfaces of computing devices. An electronic device tester is disclosed including a downstream communication interface configured to communicatively couple the electronic device tester to a device under test (DUT), wherein the electronic device tester is configured to identify a first internal hub of the DUT over the downstream communication interface, identify a second hub device connected to the DUT over a downstream interface port of the DUT, verify performance of the downstream interface port of the DUT at a first data rate by receiving data over a first downstream port of the second hub device via the downstream interface port of the DUT, and verify performance of the downstream interface port of the DUT at a second data rate by receiving data over a second downstream port of the second hub device via the downstream interface port of the DUT.

20 Claims, 5 Drawing Sheets

COMMUNICATION INTERFACE TESTING

BACKGROUND

Electronic devices can be configured to perform intra-device communications using transmission lines and/or communication interface ports. Testing of communication interface ports and/or other components in a transmission chain of an electronic device may be desirable for various purposes.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claims. Disclosed herein are example configurations and embodiments relating to communication interface testing in electronic devices.

Overview

During manufacturing and/or processing of electronic devices comprising one or more communication interface ports, it may be desirable to test the functionality and/or performance of such interface port(s) in order to determine whether the electronic device is operational as intended. For example, the functionality of USB interface ports may be subject to functional and/or electrical testing to ensure proper data communication operation according to one or more USB standards, such as USB 2.0 and/or USB 3.0.

According to various interface testing procedures, an electronic device's downstream USB interface may be tested by connecting a USB 2.0 device to the interface, verifying USB 2.0 functionality of the interface, manually removing the USB 2.0 device from the interface, connecting a USB 3.0 device to the interface, and verifying USB 3.0 functionality of the interface. The purpose of such processes may be to ensure satisfactory USB 3.0 and USB 2.0 functionality and/or good condition of data transmission path connections.

Certain embodiments disclosed herein provide improved devices and systems for testing communication interfaces of various electronic devices through the use of data communication hubs. For example, a plurality of USB 3.0 hubs may be used to test both USB 2.0 and USB 3.0 functionalities without the need to remove one USB device and insert another USB device. Thus, systems and methods disclosed herein may at least partially eliminate one or more manufacturing steps associated with device interface testing, and potentially reduce the risk of human error during testing.

Using additional hubs for the relevant testing fixture, wherein the structure and functionality of the hubs may be advantageously utilized, may allow for at least partially automated processes for testing products' downstream interface ports for communication capability according to a plurality of communication protocols/standards with minimal labor and/or physical operator intervention.

Data Storage System

Figure 1:
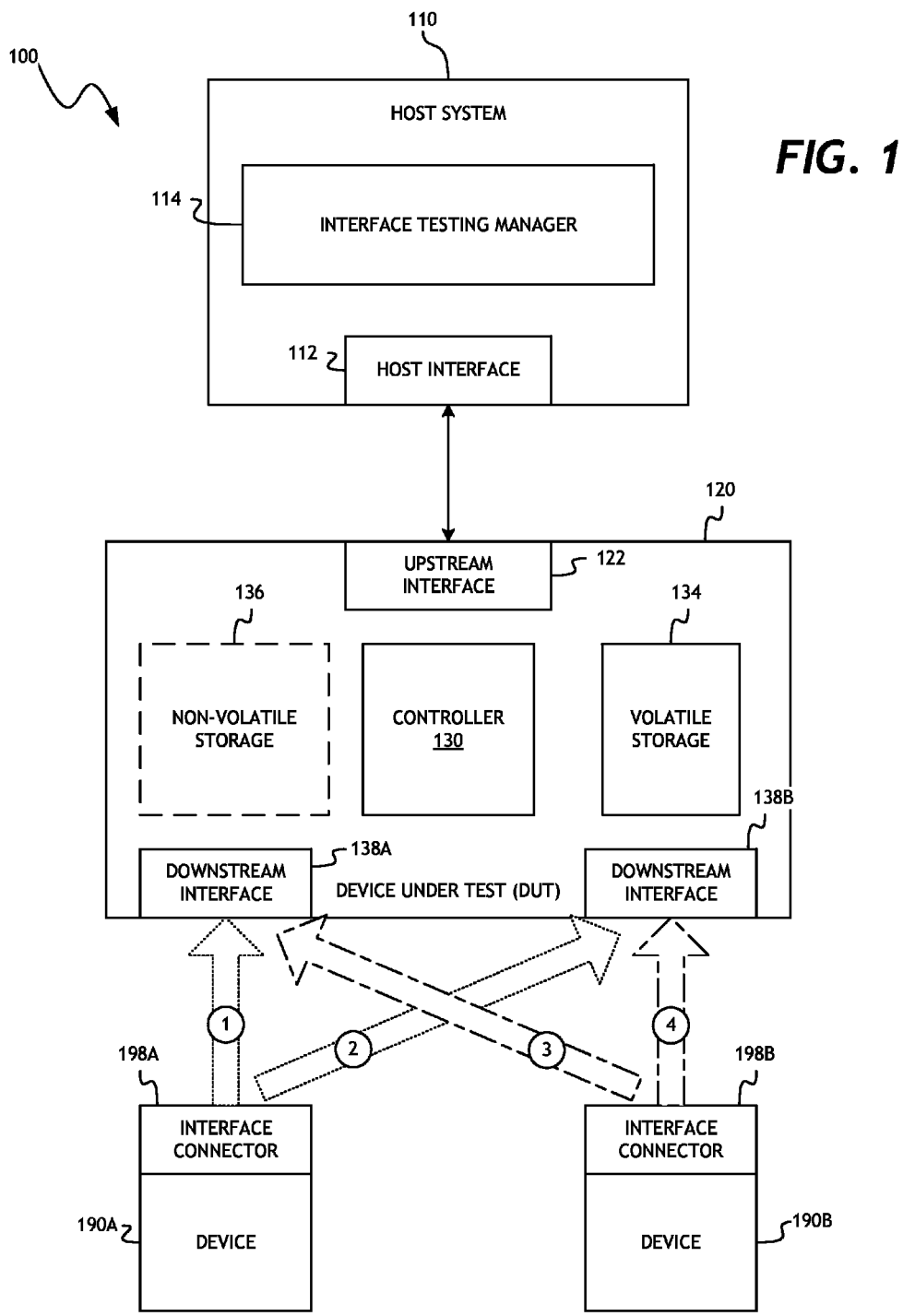
FIG. 1 is a block diagram representing a data communication testing system according to an embodiment.

FIG. 1 is a block diagram illustrating an embodiment of a device interface testing system 100. The system 100 comprises a host system 110 including an interface testing manager module 114 as well as at least one downstream communication interface 112. The interface testing manager 114 may be configured to analyze signals received over the host interface 112 from one or more devices being tested, such as the device under test (DUT) 120, and determine whether one or more downstream interface ports of devices being tested are functioning properly according to certain criteria. The host interface 112 may be any suitable communication interface, and may comprise a physical interface port. For example, the host interface may be a USB interface, an Ethernet interface, or any other wired interface. In certain embodiment, the host interface 112 is a wireless interface, such as a WiFi interface.

The system 110 is in communication with the DUT 120 through a coupling between the host interface 112 and an upstream interface 122 of the DUT 120. The DUT may be any type of electronic device that includes at least one downstream interface 138A, 138B, for which functionality testing may be desirable. For example, the DUT 120 may be a data storage device, which may comprise nonvolatile storage 136, such as magnetic and/or solid-state storage media. The DUT 120 may further comprise volatile storage 134, such as a solid-state DRAM memory, or the like. Although the DUT 120 is illustrated as including two downstream interfaces 138A, 138B, it should be understood that DUT devices disclosed herein may comprise any suitable or desirable number of downstream interface ports, one or more of which may be the subject of functionality testing according to methods or embodiments disclosed herein.

Testing of downstream interface(s) of the DUT 120 may be desirable to identify unsatisfactory functionality/operation of the interface(s) caused by any of a variety of conditions. For example, bad solder joints, bridging in solder joints, missing components/parts, damaged wires on the controller board (PCBA) or in devices disposed on the controller board (e.g., ASIC chip) may result in faulty operation. Although certain embodiments herein are disclosed in the context of interface functionality testing, the term "functionality" is used herein according to its broad and ordinary meaning, and may include, for example performance, speed and/or connectivity of an interface port or communication transmission path.

In order to evaluate the functionality of the downstream interface ports 138A, 138B, it may be desirable to connect one or more devices 190A, 190B (e.g., USB flash drives) to the respective downstream interface ports to determine whether the ports are functional with respect to communications with each of the devices. For example, each of the devices 190A, 190B may correspond to a different communication protocol or standard (e.g., configured to implement data communication at different data rates). In certain embodiments, each of the devices 190A, 190B may correspond to a different USB communication standard, such as USB 2.0, USB 3.0, USB 3.1, or other USB communication standard. In communicating with the various USB standards, data communication rates may differ. Therefore, in order to determine whether each of the devices 190A, 190B are functional with a particular downstream interface port of the DUT 120, data communication over the respective downstream interface of the DUT 120 may be analyzed from a coupled device (e.g., 190A) at a data rate associated with the coupled device. For example, a USB 3.0 device may be configured to communicate at a data rate that is higher than that of a USB 2.0 device.

In order to perform functionality testing of the DUT 120 for each of the downstream interface ports 138A, 138B, it may be necessary for a testing operator or user to execute a plurality of physical connections of testing devices to a given interface port in order to evaluate functionality for a plurality of communication standards or protocols. For example, the called-out steps in FIG. 1 illustrates a process for evaluating functionality of each of the downstream interface ports 138A, 138B for two separate data communication standards. As shown, in order to test functionality of both interfaces 138A, 138B, the operator may first connect a first device 190A to the first downstream interface 138A (step 1) and evaluate functionality of the downstream interface while coupled therewith, wherein coupling between the device 190A and the downstream interface 138A is effected using an interface connector 198A associated with the device 190A, which may include a physical male engagement structure having one or more exposed pins for coupling with corresponding structure and/or pins of the downstream interface port 138A. The testing process may further require the operator to remove the device 190A from the downstream interface 138A and reconnect the device 198A to the second downstream interface port 138B using the interface connector 198A (step 2), and further test the functionality of the downstream interface 138B with respect to a communication standard associated with the device 190A while the device 190A is coupled to the downstream interface 138B.

In order to test functionality of the downstream interfaces 138A, 138B, it may further be necessary for the operator to connect a second device 190B configured to communicate using the second data communication standard to each of the downstream interface ports 138A, 138B (steps 3 and 4) and test the functionality of each interface as it is coupled with the device 190B. Therefore, in certain embodiments, downstream interface testing of the DUT may require physically connecting and disconnecting a device for each interface port being tested and for each communication standard being tested. Such connecting and disconnecting by the operator may introduce risk of operator error and/or damage to physical components through excessive handling and manipulation. Therefore, in certain situations, functionality testing may result in an indication of failure of one or more interface ports of the DUT, wherein such failure may have been at least in part caused by operator error or other causes associated with having to manually insert and remove testing devices from a DUT multiple times. Furthermore, inefficiency associated with manual plugging/unplugging of testing devices can increase the amount of time required to perform testing.

Figure 2:
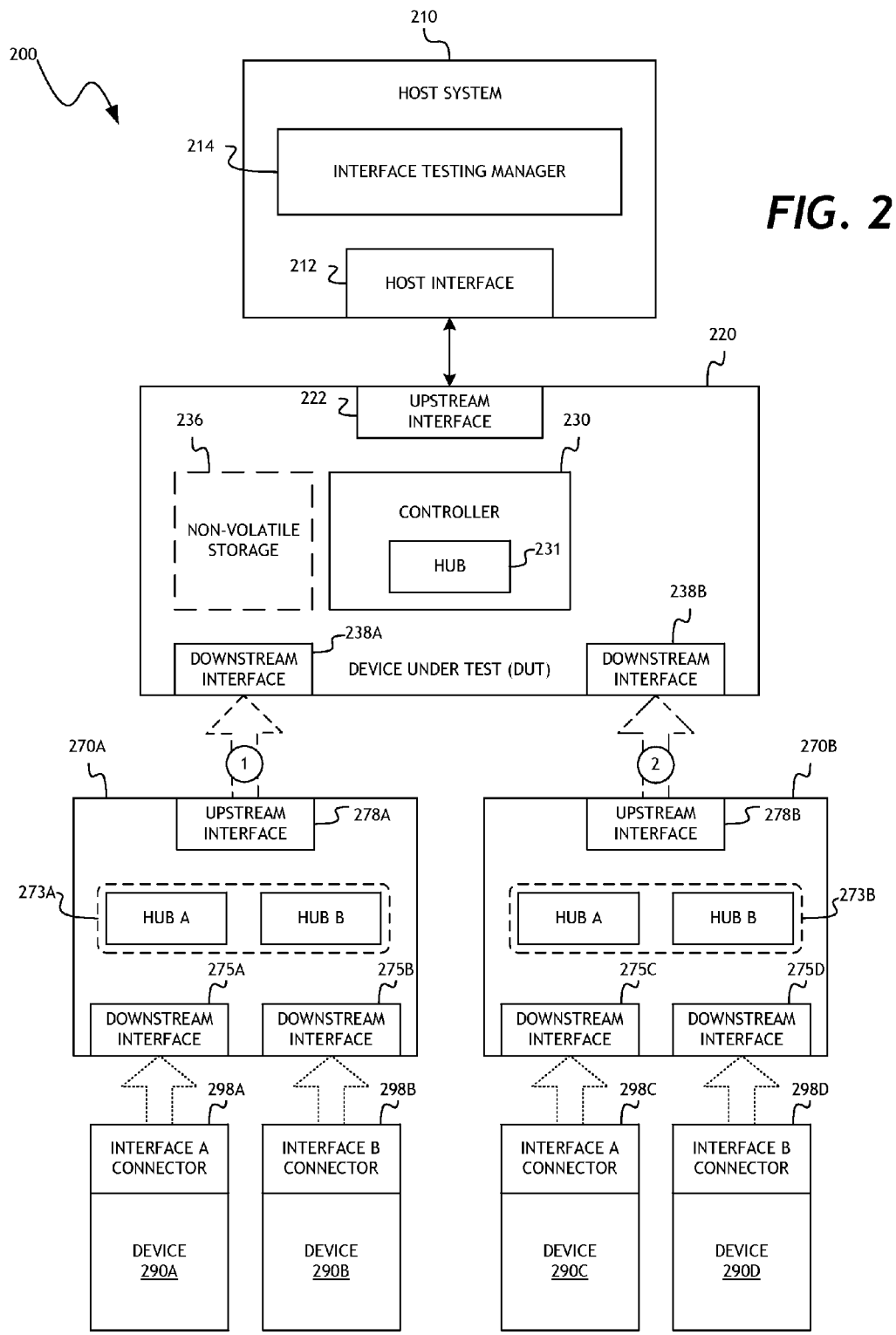
FIG. 2 is a block diagram representing a data communication testing system according to an embodiment.

Certain embodiments disclosed herein provide systems and/or methods that allow for testing of the downstream interface port of a DUT with fewer steps and/or less operator interaction/engagement required. FIG. 2 illustrates a block diagram of a system 200 for testing functionality of one or more downstream interface ports of a DUT 220. The solution of FIG. 2 may utilize, for example, a USB 3.0 hub with USB 3.0 and USB 2.0 testing devices connected thereto. Alternatively, the hub may conform to one or more other communication protocols. For a USB 3.0 hub embodiment, the hub may electrically expose the USB 2.0 device with the USB 2.0 signal connections as well as the USB 3.0 device with the USB 3.0 signal connections to the DUT's USB downstream interface. Although the description below is presented in the context of a USB 3.0/2.0 solution, it should be understood that any combination of devices/communication protocols may be implemented within the scope of the present disclosure. For example, the solutions presented herein may be applicable for testing functionality/performance of a downstream interface of a device under test with any two or more communication standards/protocols, wherein devices conforming to each of the two or more standards are connected to a hub device that is communicatively coupled to the downstream interface of the device under test. Furthermore, although certain discussion herein focuses on a single downstream interface of a device under test, such devices may comprise multiple downstream interfaces, and the principles discussed may be extended to testing with respect to the additional interfaces as well.

The DUT 220 may be a dual device including an internal hub 231 and one or more downstream interface ports 238A, 238B. The interface testing manager 214 of the host system 210 may comprise software and/or firmware designed to check for the presence of both a USB 3.0 device and a USB 2.0 device on the DUT's downstream USB interface (e.g., 238A) substantially without further operator intervention.

Similarly to the system shown in FIG. 1, the illustrated host system 210 includes at least one host interface 212, which may be any wired or wireless interface, as suitable or desired. The interface testing manager 214 may comprise specialized software, wherein the host system/device 210 is configured to execute the software using one or more processors and/or other computer hardware in order to implement features/processes disclosed herein.

The DUT 220 is configured to communicate with the host system 210 using an upstream interface 222, which may be a wired or wireless interface port, such as a physical connector port having one or more pins or structures configured to mate or coupled with a cable or connector structure associated with the host system 210. The DUT 220 may be a data storage device or any other electronic device having one or more downstream interface ports which are to be tested. For example, with respect to a data storage device embodiment, the DUT 210 may include non-volatile storage media 236, such as magnetic media and/or solid-state media.

The DUT 220 further includes a controller 230 that may be configured to provide controller logic for the device 220, and may be disposed on or associated with a controller board, such as a printed circuit board assembly (PCBA). While certain embodiments are disclosed herein in the context of a DUT that is a data storage device, it should be understood that devices under test as described herein may be any electronic device having one or more downstream interface ports.

In an embodiment in which the DUT 220 is a data storage device (e.g., magnetic hard drive, solid-state drive, hybrid drive, etc.), the controller 230 may be configured to receive data commands and execute such commands in a non-volatile storage module 236, which may include magnetic and/or solid-state data storage media. Such commands may include data read/write commands, and the like. The controller 230 may be configured to receive data commands that specify a physical or logical address in the storage 236; data may be accessed/transferred based on such commands.

The controller 230 may include one or more memory modules (not shown), such as non-volatile memory (e.g., ROM) and/or volatile memory (e.g., RAM, such as DRAM). In certain embodiments, the controller 230 may be configured to store information, including, for example, operating system(s) code, application code, system tables and/or other data, in the non-volatile storage 236. On power-up, the controller 230 may be configured to load such data for use in operation of the DUT 220. The DUT 220 may be configured to store data received from a host such that the DUT acts as data storage for the connected host. To facilitate this function, the controller 230 may implement a logical interface. The logical interface can present to the host system memory as a set of logical addresses (e.g., sequential/contiguous addresses) where data can be stored. Internally, the controller 230 can map logical addresses to various physical memory addresses in the non-volatile storage 236 and/or other memory module(s).

The DUT 220 includes one or more downstream interfaces 238A, 238B. Although two downstream interfaces are illustrated, it should be understood that the DUT 220 may include a single downstream interface, or any other number of downstream interfaces. For example, the DUT 220, in an embodiment, comprises four downstream interface ports. The downstream interface ports of the DUT 220 may be communication interfaces associated with any suitable or desirable communication protocol, such as, for example, USB, Thunderbolt, Micro-USB, HDMI, or any other communication interface.

According to certain embodiments, in order to test the functionality of one of the downstream interface ports, such as downstream interface port 238A, it may only be necessary for an operator or user to make a single physical connection at the interface port being tested, regardless of whether multiple data communication standards are to be tested over the port. In order to allow for such simplified testing processes, the system 200 includes one or more hub devices 270A, 270B, each of said hub devices including at least one downstream interface port for each communication protocol for which the DUT is to be tested.

Each of the hub devices 270A, 270B provides a device that expands a single upstream interface (e.g., 278B), such as a USB port, into multiple downstream ports (e.g., 275A, 275B). While the hub device 270A may be a stand-alone hub, hub circuitry 231 may also be built into the DUT 220. The hub device 270A may have any suitable form factor, such as a "short cable" form factor, wherein an integral cable may at least slightly distance a hub housing, which includes at least part of the hub circuitry, from the physical upstream port 278A. The hub device 270A may enable one-step attachment and removal of all testing devices (298A, 298B) connected thereto. The connection of the hub device 270 to the DUT 220, which also includes a hub 231, may form a USB network connected to the host system 210.

The hub 270A may be configured to process/forward data signals conforming to various, e.g, USB standards, such as USB 1.1, USB 2.0, USB 3.0, USB 3.1, etc. The hub 270A may be bus-powered, wherein the hub 270A draws power from the host system's USB interface (e.g., DUT 220, host 210), and/or the hub 270A may be powerable using a separate power connection.

Although the hub 270A may be configured to operate at higher speeds (e.g., USB 3.0), the hub 270A may be configured to fall back to lower speed (e.g., USB 2.0) when plugged into a lower-speed hub or connected to a lower-speed device (e.g., device 290B). In certain embodiments, lower-speed traffic may be combined and/or segregated from higher-speed traffic through, for example, a transaction translator, which may be integrated with or separate from the hub 270A. In such an embodiment, the transaction translator (not shown) may be configured to automatically recognize and translate lower-speed signals to higher-speed signals on the uplink.

During normal transmission, the hub 270A may be substantially transparent, wherein data received on the upstream interface port 278A may be broadcast to each of the downstream interface ports 275A, 275B, while data received on one of the downstream interface ports 275A, 275B may generally be forwarded to the upstream interface port 278A only. The hub circuitry 273A of the hub device 270A may comprise one or more integrated controller ICs having any suitable design. The embodiments disclosed herein may provide interface testing solutions that take advantage of the architecture of certain types of hubs, such as USB 3.0 hubs. With respect to USB 3.0 hubs, such hubs may electrically comprise a USB 3.0 hub in addition to a USB 2.0 hub, thereby allowing for both USB 3.0 and USB 2.0 physical interface connectors to be electrically tested with one configuration.

As referenced above, each of the hub devices 270A, 270B may include hub circuitry 273A, 273B. With respect to the hub device 270A, the hub circuitry 273A may include separate data paths for each of a plurality of data communication protocols. That is, the hub circuitry 273A may effectively comprise a plurality of hubs figured to operate substantially independently of one another (hub A, hub B). The hub device 270A further includes a plurality of downstream interfaces 275A, 275B. In certain embodiments, a testing operator or user may couple the hub device 270A to a separate testing device for each of the data communication protocols to be tested. For example, a first device 290A may correspond to a first communication protocol, such as USB 3.0, while a second testing device 290B may be coupled to the downstream interface 275B, the second device 290B being associated with a second communication protocol, such as USB 2.0. When testing multiple DUTs, it may only be necessary for the operator to connect the devices 290A, 290B to the hub 270A a single time, wherein the testing devices (e.g., thumb drives for each of a plurality of communication standards) may remain coupled to the hub 270A while the hub 270A is used to test the multiple DUTs.

When the operator connects the hub 270A to the downstream interface port 238A of the DUT 220, the hub circuitry 231 of the controller 230 may be configured to receive signals for each of the communication protocols being tested via the hub circuitry 273A of the hub 270A. The internal hub circuitry 231 of the DUT 220 may be configured to receive the data signals for each of the communication protocols from the hub 270A and provide signals to the host system 210 over the upstream interface 222, such as over independent data paths, for example. Therefore, with a single connection of the hub 270A, in certain embodiments, the testing operator may be able to test the downstream interface 238A for a plurality of communication protocols using the internal hub circuitry 231 of the DUT 220.

Although the system 200 illustrates the interface testing manager 214 as a component of the host system 210, in certain embodiments, the interface testing functionality may be integrated in the DUT 220, wherein the DUT 220 is configured to assess the functionality of the downstream interfaces 238A, 238B without necessitating communication with a host system. For example the DUT 220 may be a data storage drive having an internal integrated hub 231 and interface testing manager 214 for testing each of its downstream interfaces 238A, 230B. In certain embodiments, a custom operating system kernel may be downloaded to the DUT 220 for manufacturing purposes, wherein the manufacturing kernel provides functionality for testing of interface ports as described herein, and downloading an at least partially different customer kernel to the DUT 220 after testing is complete.

Device Testing Processes

Figure 3:
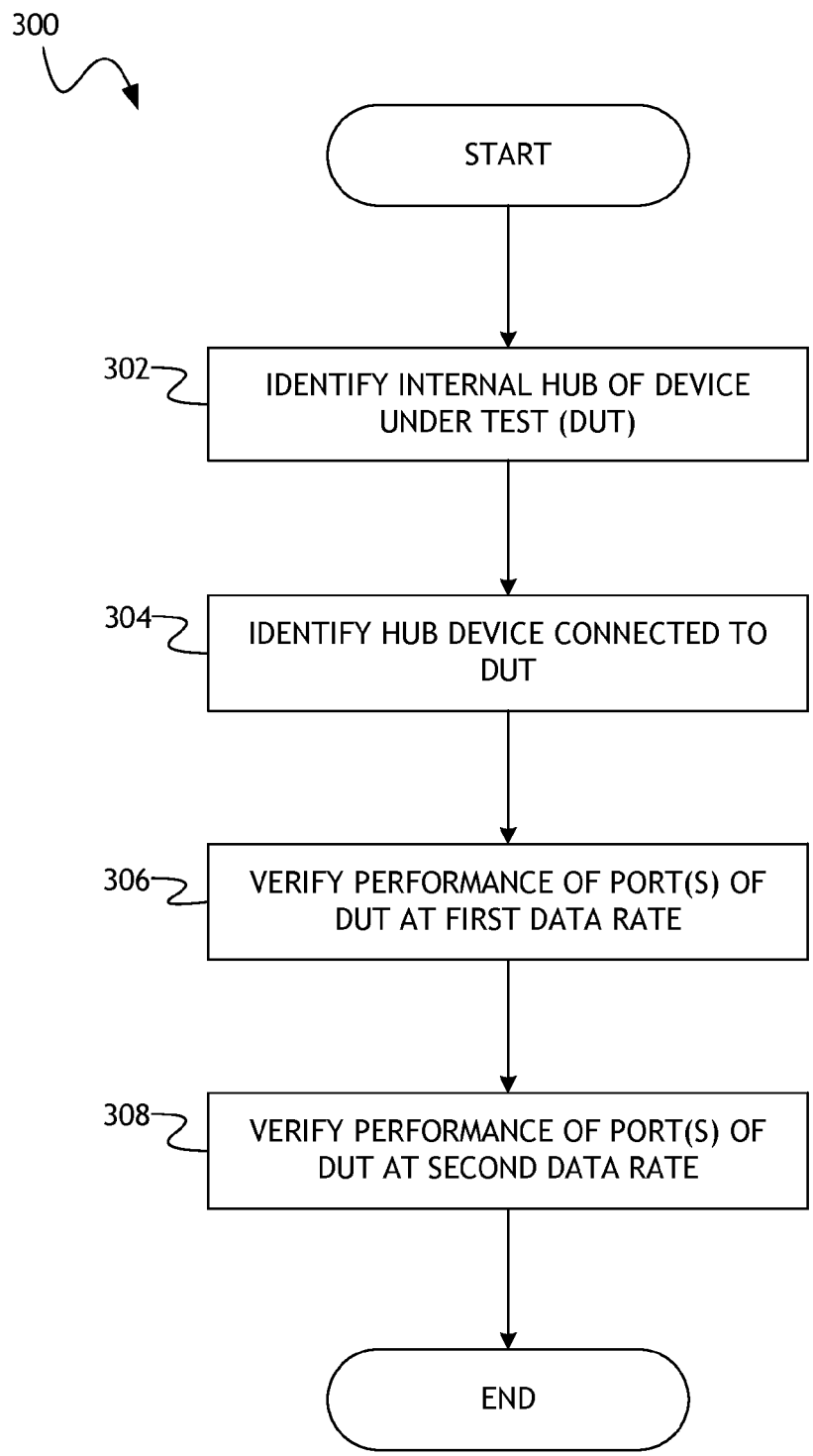
FIG. 3 is a flow diagram illustrating a process for verifying performance of an electronic device.

FIG. 3 illustrates a process 300 for verifying performance and/or functionality of one or more downstream interface ports of a device under test (DUT), as described herein. In certain embodiments, the process 300 may be implemented by a host system, such as the host system 210 illustrated in FIG. 2 and described above. In certain embodiments, the process 300 involves identifying an internal hub of the DUT, which may be coupled to the host system over any desirable wired or wireless communication interface. For example, a host system may query a coupled DUT regarding its communications conforming to various communication standards being tested.

At block 304, the process 300 involves identifying one or more hub devices coupled to the DUT. For example, a hub device connected to the DUT may have testing devices connected thereto for providing data signals to the DUT according to the plurality of communication protocols, such as, for example, USB 3.0 and/or USB 2.0. The identification steps of the process 300 may be performed at least in part using operating system (OS) system calls requesting return of the relevant information from the DUT.

At block 306, the process 300 involves verifying performance of one or more downstream interface ports of the DUT. For example, in order to verify performance/functionality of an interface port of the DUT according to a first communication protocol, the process 300 may involve verifying data communication received at the interface port of the DUT at a first data rate associated with the first indication protocol. Furthermore, at block 308, the process 300 involves verifying performance/functionality of the downstream interface port of the DUT according to a second communication protocol, which may be tested at least in part by receiving data communication signals from the hub device at a second data rate associated with the second indication protocol.

In one example embodiment, the verification steps of the process 300 involve checking whether the attached DUT is reporting, for example, USB 3.0 data speeds to indicate that the USB 3.0 functionality of a downstream port of the DUT is operable. If the DUT does not report connection at USB 3.0 speed, the process 300 may involve reporting a failure. However, it should be understood that downstream interface performance/functionality verification may be determined in any desirable or suitable manner. For example, as referenced, analysis of signal data rates may provide an indication of whether a downstream interface port is functional. Furthermore, certain embodiments, performance/functionality testing may involve analyzing the connectivity of a downstream interface port of the DUT and/or data transmission path associated therewith.

The process 300 may be performed at least in part under the control of a processor of a host computing device. Furthermore process 300 may at least in part be performed by one or more processors of the device to be tested and/or other computing devices. Verification of the port(s) with respect to the plurality of communication standards may be performed serially or in parallel. Furthermore, the process 300 may be at least partially automated, wherein one or more steps are performed automatically in response to connection of the DUT and/or hub device 270A.

Figure 4:
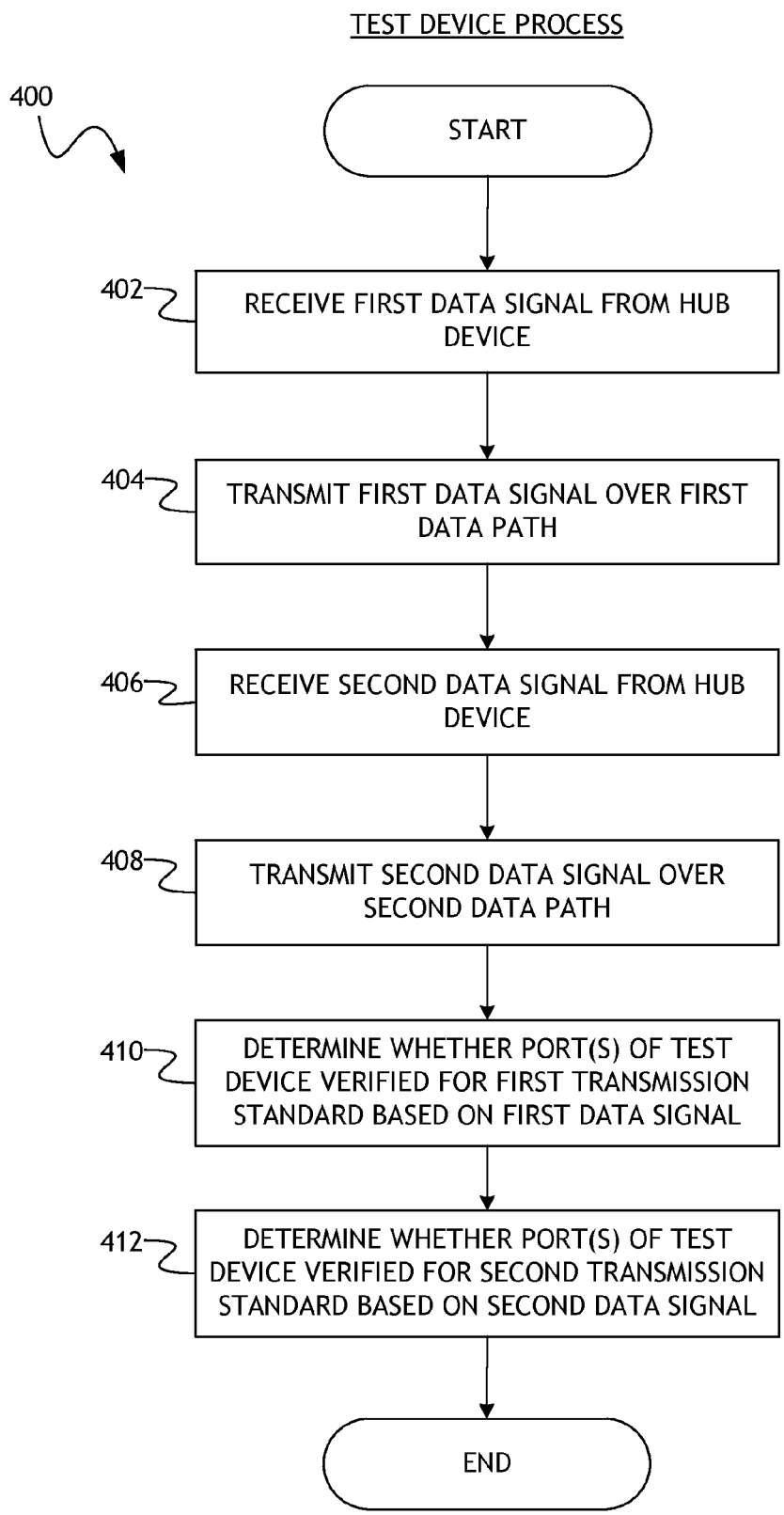
FIG. 4 is a flow diagram illustrating a process for verifying performance of an electronic device.

FIG. 4 illustrates a flow diagram for process of verifying functionality/performance of one or more downstream interface ports of a device under test (DUT), as described herein. The process 400 involves, at block 402, receiving a first data signal from a hub device connected to the DUT over a downstream communication interface port of the DUT. The hub device may be a USB hub, such as a USB 3.0 hub, or other hub device configured to allow for receipt and/or transmission of data signals conforming to a plurality of data communication standards. After receiving the first data signal, the DUT may be configured to transmit the first data signal over a first data path. The first data path may be part of internal hub circuitry of the DUT. The process 400 further involves, at block 406, receiving a second data signal from the hub device. The second data signal may be received over the same downstream interface port of the DUT over which the first data signal is received. At block 408, the process 400 involves transmitting the second data signal over a second data path, which likewise may be part of internal hub circuitry of the DUT. In certain embodiments, the first data path and the second data path are independent of one another and do not overlap or connect at any point or node.

At block 410, the process 400 involves determining whether the downstream interface port of the DUT is verified with respect to data transmissions conforming to a first communication standard, wherein such determination is based at least in part on analysis of the first data signal and/or characteristics thereof. For example, the DUT or other computing device may be configured to analyze the first data signal, which is transmitted on the first data path of the internal hub circuitry of the DUT, and determine based on such analysis whether or not the downstream interface port over which the first data signal was received by the DUT is functional for the first transmission standard which is associated with the first data signal. At block 412, process 400 involves determining whether the downstream interface port the DUT is verified for operation according to a second transmission standard. Such verification may be based on analysis or evaluation of the second data signal. For example, assessment of the timing, quality and/or characteristics of the second data signal may indicate whether the downstream interface port of the DUT is functional for data transmissions according to the second indication protocol.

Figure 5:
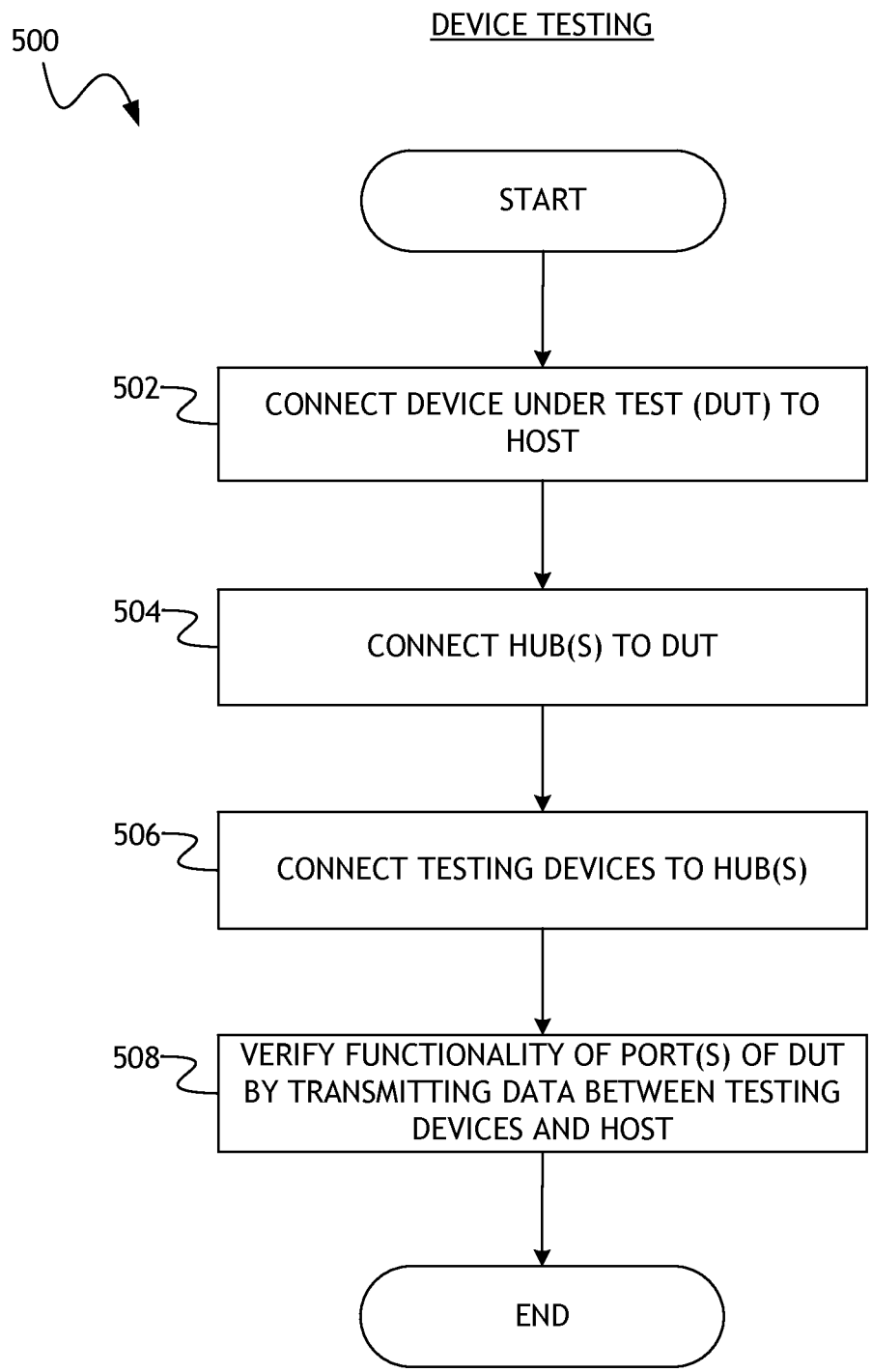
FIG. 5 is a flow diagram illustrating a process for verifying performance of an electronic device.

FIG. 5 is a flow diagram illustrating a process 500 for testing one or more computing devices. Such devices are referred to herein as devices under test (DUTs), wherein such devices comprise one or more downstream interface ports that are configured to operate according to one or more communication standards, wherein the process 500 is concerned with verifying proper operation/functionality of such downstream interface port(s). At block 502, the process 500 involves connecting a DUT to a host system, such as a host computing system, which may be a mobile computing system, such as a laptop or smart phone or tablet computer, or the like, or may be a desktop or other computing system configured to be communicatively coupled with the DUT in some manner. For example, in certain embodiments, the step of block 502 involves connecting a cable between the host device and the DUT. Furthermore, in certain embodiments, connecting the host to the DUT may involve pairing or coupling the host to the DUT wirelessly, such as over Bluetooth Wi-Fi or other wireless communication protocol.

At block 504, the process 500 involves connecting one or more hub devices to the DUT; a hub may be connected to each of a plurality of downstream interface ports of the DUT, for example. The hub device(s) may be any type of hub device, such as a USB hub (e.g., USB 3.0). For example, the hub device may be configured to receive USB 2.0 and USB 3.0 signals over plurality of downstream interface ports of the hub device and forward the received signals over a shared upstream interface port of the hub device. Signals may be provided over the shared upstream interface port of the hub to the DUT via the downstream interface port of the DUT which is the subject of testing.

At block 506, the process 500 involves connecting a plurality of thumb drives or other types of devices configured to transfer data according to a particular communication protocol, which may be referred to herein as "testing devices." In certain embodiments a thumb drive or other testing device is connected to the hub for each of a plurality of the downstream interface ports of the hub device, wherein each of the connected testing devices corresponds to a different communication protocol. For example, a USB 3.0 hub may have connected thereto a USB 2.0 thumb drive as well as a USB 3.0 thumb drive, wherein the hub allows for transmission of signal over both USB 2.0 and USB 3.0 from the respective thumb drives to the DUT via an upstream interface port of the hub device as well as the downstream interface port of the DUT. Therefore, when connected as described in steps 502-506, the host may transmit/receive data signals to/from the individual thumb drives or testing devices connected to the downstream interface ports of the hub device via the hub circuitry of the hub device, the upstream interface of the hub device, the downstream interface of the DUT, internal hub circuitry of the DUT, an upstream host interface of the DUT, as well as a downstream interface of the host device/system. Such communication between the host and the end connection testing devices may allow the host to verify functionality/operation of the downstream interface port of the DUT for each of a plurality of communication protocols without requiring disconnection and/or reconnection of devices in the interim.

The step recited at block 508, among other possible steps, may be performed at least in part under the direction of a controller of the host device/system, the controller comprising one or more processors and/or data storage modules. The process 500 may allow for at least partial automation of testing of communication according to a plurality of data communication standards of a single downstream port of the DUT, wherein minimal operator intervention and/or test steps may be required. For example, one or more of the steps of the process 500 may be performed automatically in response to connection of the DUT to the host, connection of the hub device to the DUT, and/or connection of one or more testing devices to the hub device.

ADDITIONAL EMBODIMENTS

Those skilled in the art will appreciate that in some embodiments, other types of communication interface testing systems can be implemented while remaining within the scope of the present disclosure. In addition, the actual steps taken in the processes discussed herein may differ from those described or shown in the figures. Depending on the embodiment, certain of the steps described above may be removed, and/or others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. An electronic device tester comprising:
   a downstream communication interface configured to communicatively couple the electronic device tester to a device under test (DUT);
   a processor; and
   a non-volatile memory storing instructions that, when executed by the processor, cause the processor to:
      identify a first internal hub of the DUT over the downstream communication interface;
      identify a second hub device connected to the DUT over a downstream interface port of the DUT, the second hub device comprising a first downstream interface port and a second downstream interface port;
      verify performance of the downstream interface port of the DUT at a first data rate by receiving data over the first downstream port of the second hub device via the downstream interface port of the DUT; and
      verify performance of the downstream interface port of the DUT at a second data rate by receiving data over the second downstream port of the second hub device via the downstream interface port of the DUT.

2. The electronic device tester of claim 1, wherein the DUT is a data storage device.

3. The electronic device tester of claim 1, wherein the instructions further cause the processor to:
   detect connection of the DUT; and
   perform said identifying the first internal hub and the second hub device in response to said detection.

4. The electronic device tester of claim 1, wherein the downstream communication interface comprises a computer network interface.

5. The electronic device tester of claim 1, wherein the downstream communication interface comprises one or more of a Universal Serial Bus (USB) interface, an Ethernet interface, a WiFi interface and a Thunderbolt interface.

6. The electronic device tester of claim 1, wherein the downstream interface port of the DUT is a Universal Serial Bus (USB) interface, wherein the first data rate corresponds to a first USB standard and the second data rate corresponds to a second USB standard.

7. The electronic device tester of claim 1, wherein the first internal hub of the DUT and the second hub device are Universal Serial Bus (USB) 3.0 hubs.

8. The electronic device tester of claim 1, wherein the first internal hub and the second hub device are configured to transmit data signals at the first and second data rates over separate transmission paths.

9. A electronic device comprising:
   non-volatile storage media;
   an upstream host communication interface configured to communicatively couple the electronic device to a host device;
   a first internal hub comprising a first data path and a second data path separate from the first data path;
   a downstream interface port configured to communicatively couple the electronic device to a second hub device; and
   a controller configured to:
      receive a first data signal over the downstream interface port from the second hub device;
      transmit the first data signal over the first data path;
      receive a second data signal over the downstream interface port from the second hub device;
      transmit the second data signal over the second data path;
      determine whether the downstream interface port is verified for signal transmission according to a first transmission standard based on the first data signal; and
      determine whether the downstream interface port is verified for signal transmission according to a second transmission standard based on the second data signal.

10. The electronic device of claim 9, wherein the electronic device is a data storage device.

11. The electronic device of claim 10, wherein the non-volatile storage media comprises a plurality of magnetic disks, the electronic device further comprising a Redundant Array of Independent Disks (RAID) controller.

12. The electronic device of claim 9, wherein the controller is configured to determine whether the downstream interface port is verified for signal transmission according to the first and second transmission standards at least partially in parallel.

13. The electronic device of claim 9, wherein the electronic device is a network-attached storage device (NAS).

14. The electronic device of claim 13, wherein the upstream host communication interface is a wireless communication interface.

15. The electronic device of claim 13, wherein the upstream host communication interface comprises one or more of an Ethernet interface, Universal Serial Bus (USB) interface, and a Thunderbolt interface.

16. A method of verifying a downstream communication interface port of a device under test (DUT), the method comprising:
   connecting a DUT having one or more downstream interface ports to a host device over an upstream interface port of the DUT, the DUT comprising an internal hub supporting two or more data transmission standards;
   connecting one or more hub devices supporting the two or more data transmission standards to each of the one or more downstream interface ports of the DUT, each the one or more hub devices having one or more downstream interface ports;
   connecting devices conforming to each of the two or more data transmission standards to each of the one or more hub devices;
   verifying functionality of the one or more downstream interface ports of the DUT by transmitting data between the devices and the host device via the internal hub of the DUT;
   wherein said verifying is performed without disconnecting the devices from the one or more hub devices or disconnecting the one or more hub devices from the DUT; and
   wherein the method is performed using a processor of the host device.

17. The method of claim 16, further comprising:
   downloading a testing operating system kernel to the DUT prior to said verifying; and
   removing the testing operating system kernel from the DUT subsequent to said verifying.

18. The method of claim 16, wherein connecting the devices to each of the one or more hub devices comprises connecting a Universal Serial Bus (USB) 2.0 flash drive and a USB 3.0 flash drive to each of the one or more hub devices.

19. The method of claim 16, wherein the DUT is a data storage device.

20. The method of claim 16, wherein said verifying is performed substantially automatically in response to said connecting the one or more hub devices to the one or more downstream interface ports of the DUT.

* * * * *